United States Patent

McTamaney et al.

Patent Number: 5,170,352
Date of Patent: Dec. 8, 1992

[54] MULTI-PURPOSE AUTONOMOUS VEHICLE WITH PATH PLOTTING

[75] Inventors: Louis S. McTamaney, Cupertino; Yue M. Wong, Saratoga; Rangasami S. Chandra, Pleasanton; Robert A. Walker, Sunnyvale; Jorge E. Lastra, San Jose, all of Calif.; Paul A. Wagner, Cambridge, Mass.; Uma K. Sharma, Milpitas; Clyde D. Watson, San Jose, both of Calif.

[73] Assignee: FMC Corporation, Chicago, Ill.

[21] Appl. No.: 744,634

[22] Filed: Aug. 7, 1991

Related U.S. Application Data

[63] Continuation of Ser. No. 521,851, May 7, 1990, abandoned.

[51] Int. Cl.⁵ .............................................. G06F 15/50
[52] U.S. Cl. ................................. 364/424.02; 364/449; 364/461; 318/587
[58] Field of Search ............... 364/424.01, 424.02, 364/461, 449; 318/587; 180/167, 168, 169; 358/103

[56] References Cited

U.S. PATENT DOCUMENTS

| | | | |
|---|---|---|---|
| 4,044,853 | 8/1977 | Melke | 318/587 |
| 4,465,155 | 8/1984 | Collins | 318/587 |
| 4,652,803 | 3/1987 | Kamejima et al. | 364/424.02 |
| 4,800,977 | 1/1989 | Boegli et al. | 318/587 |
| 4,802,096 | 1/1989 | Hainsworth et al. | 318/587 |
| 4,819,758 | 4/1989 | Greene et al. | 180/168 |
| 4,846,297 | 7/1989 | Field et al. | 318/587 |
| 4,847,773 | 7/1989 | van Helsdingen et al. | 318/587 |
| 4,862,373 | 8/1989 | Meng | 364/461 |
| 4,926,171 | 5/1990 | Kelley | 364/461 |
| 4,954,962 | 9/1990 | Evans, Jr. et al. | 364/424.02 |
| 4,958,068 | 9/1990 | Pong et al. | 180/167 |
| 5,001,635 | 3/1991 | Yasutomi et al. | 364/424.02 |
| 5,034,986 | 7/1991 | Karmann et al. | 382/1 |

Primary Examiner—Parshotam S. Lall
Assistant Examiner—Michael Zanelli
Attorney, Agent, or Firm—Michael Lee; R. C. Kamp; R. B. Megley

[57] ABSTRACT

An autonomous vehicle for operating in a predetermined work area while avoiding both fixed and moving obstacles. A plurality of laser, sonic and optical sensors detect targets and obstacles in the work area and provide coded signals to processors and controllers which direct the vehicle over a most expedient route to a target while avoiding any obstacles. The vehicle is especially useful in moving around the deck of an aircraft carrier to deliver ammunition to aircraft from an ammunition magazine.

12 Claims, 14 Drawing Sheets

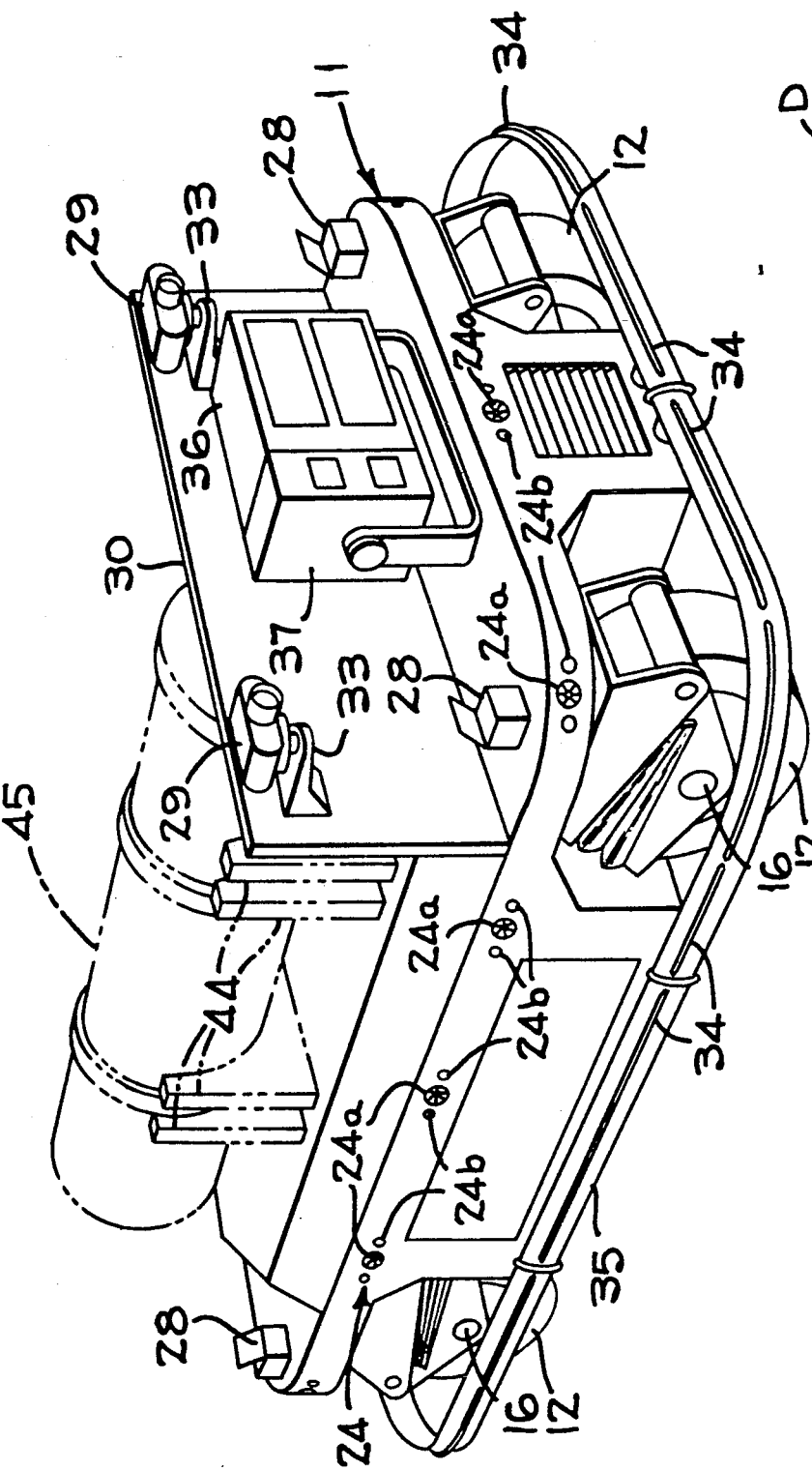
FIG_1

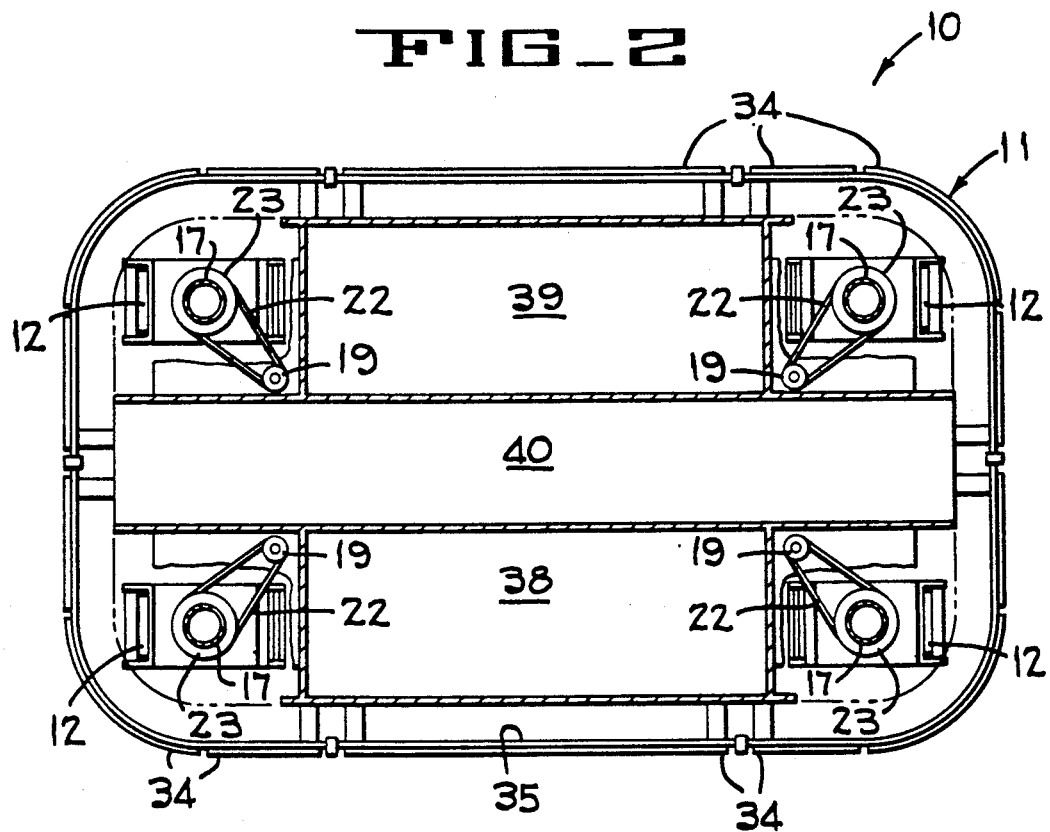
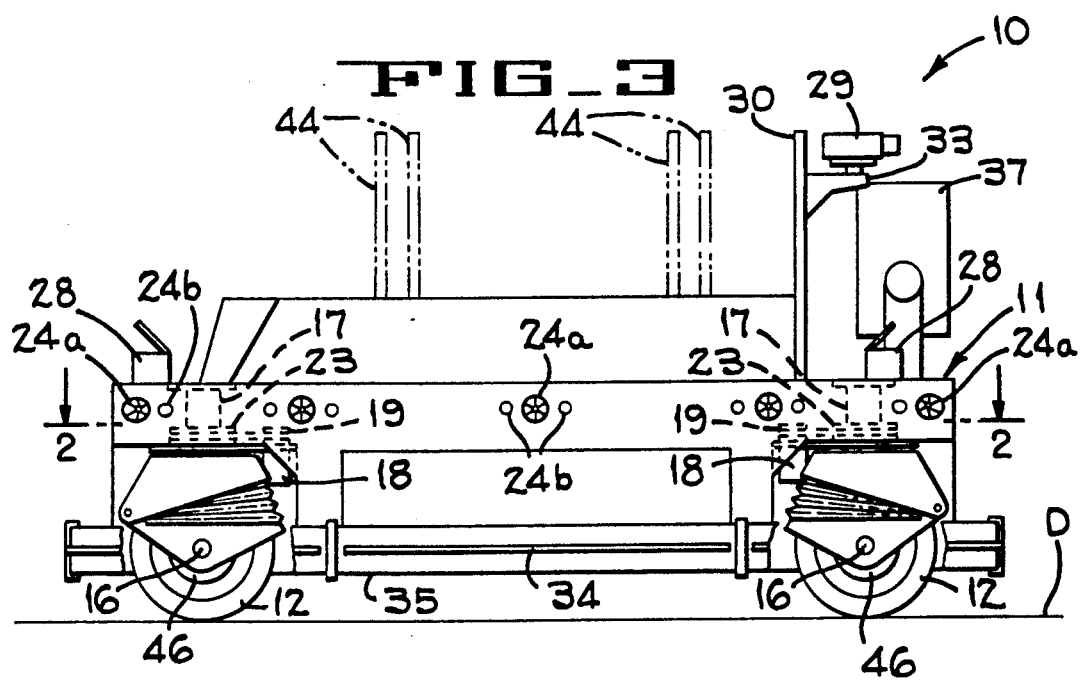

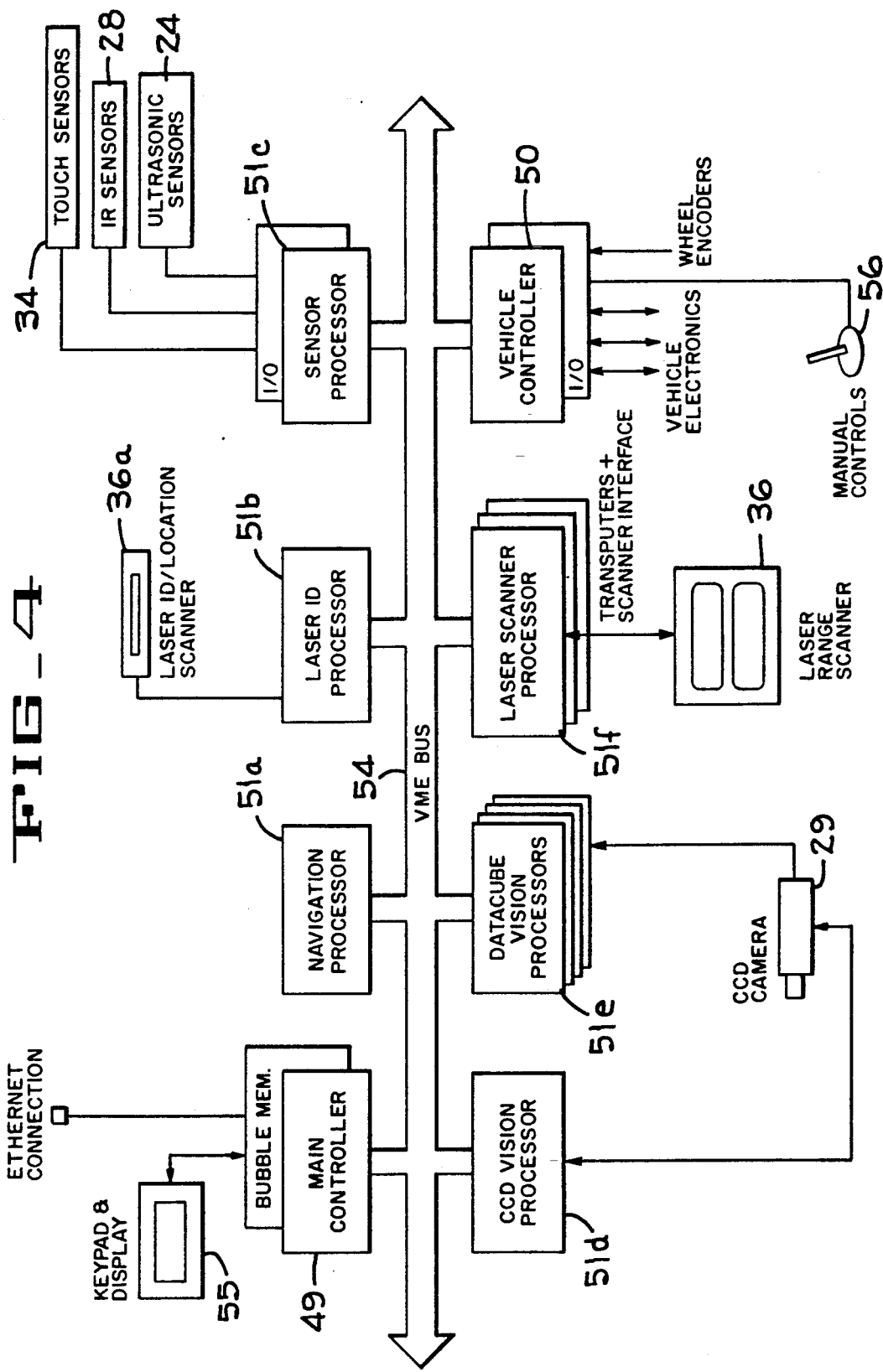
FIG_4

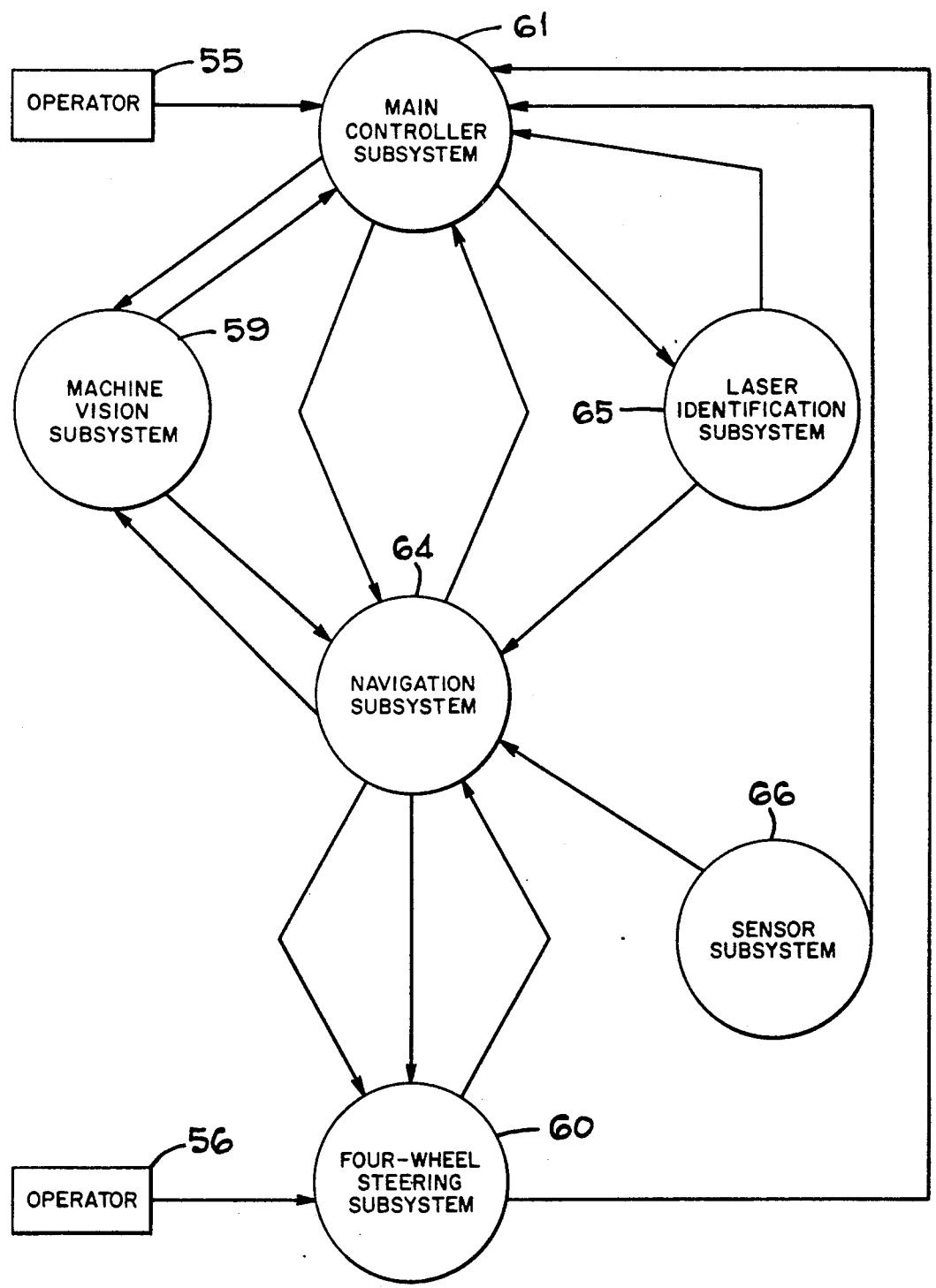

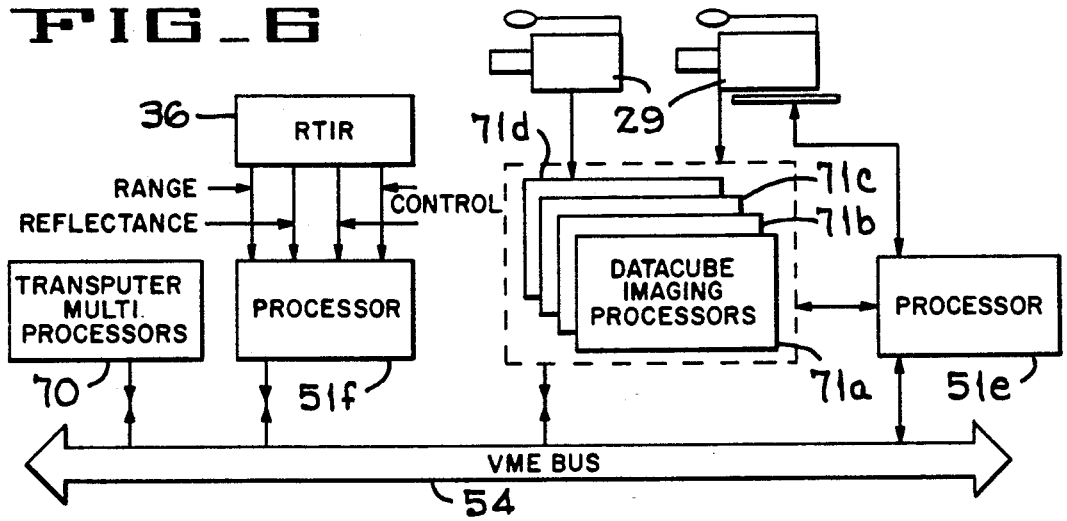
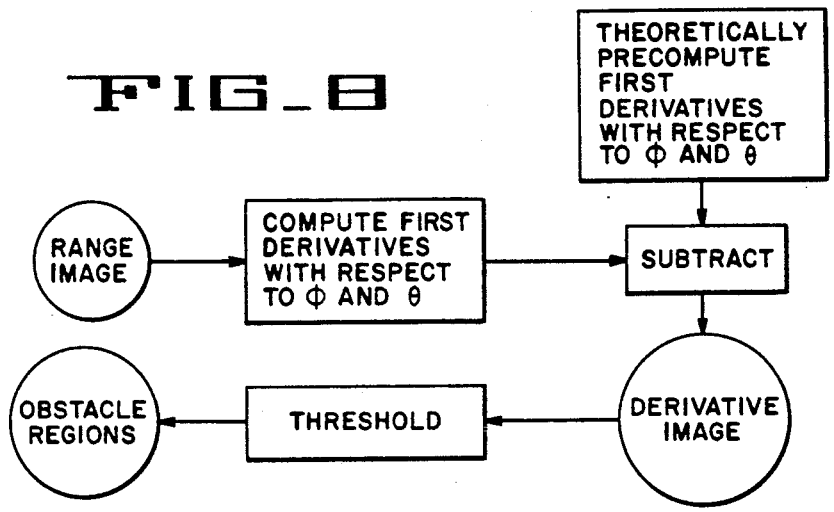
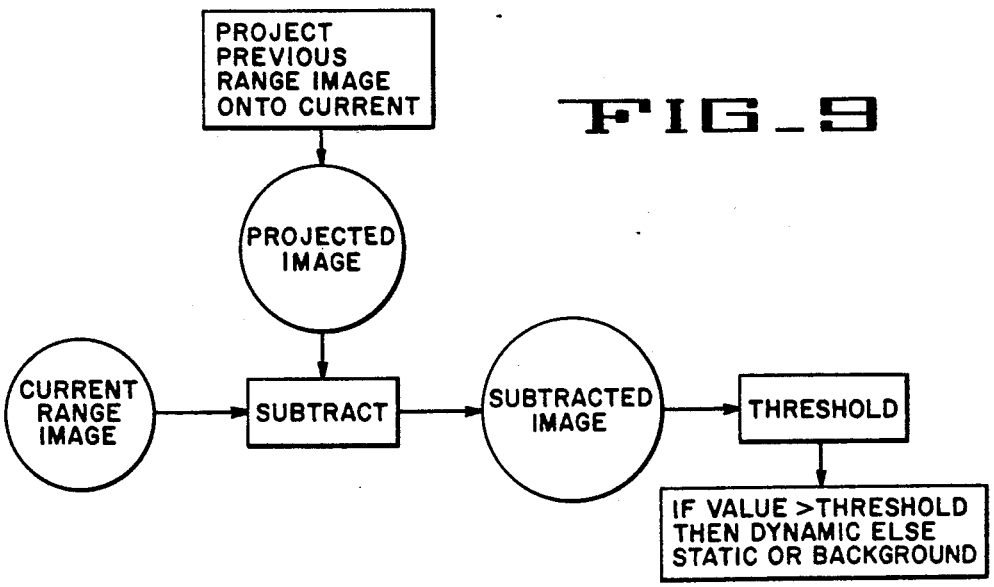

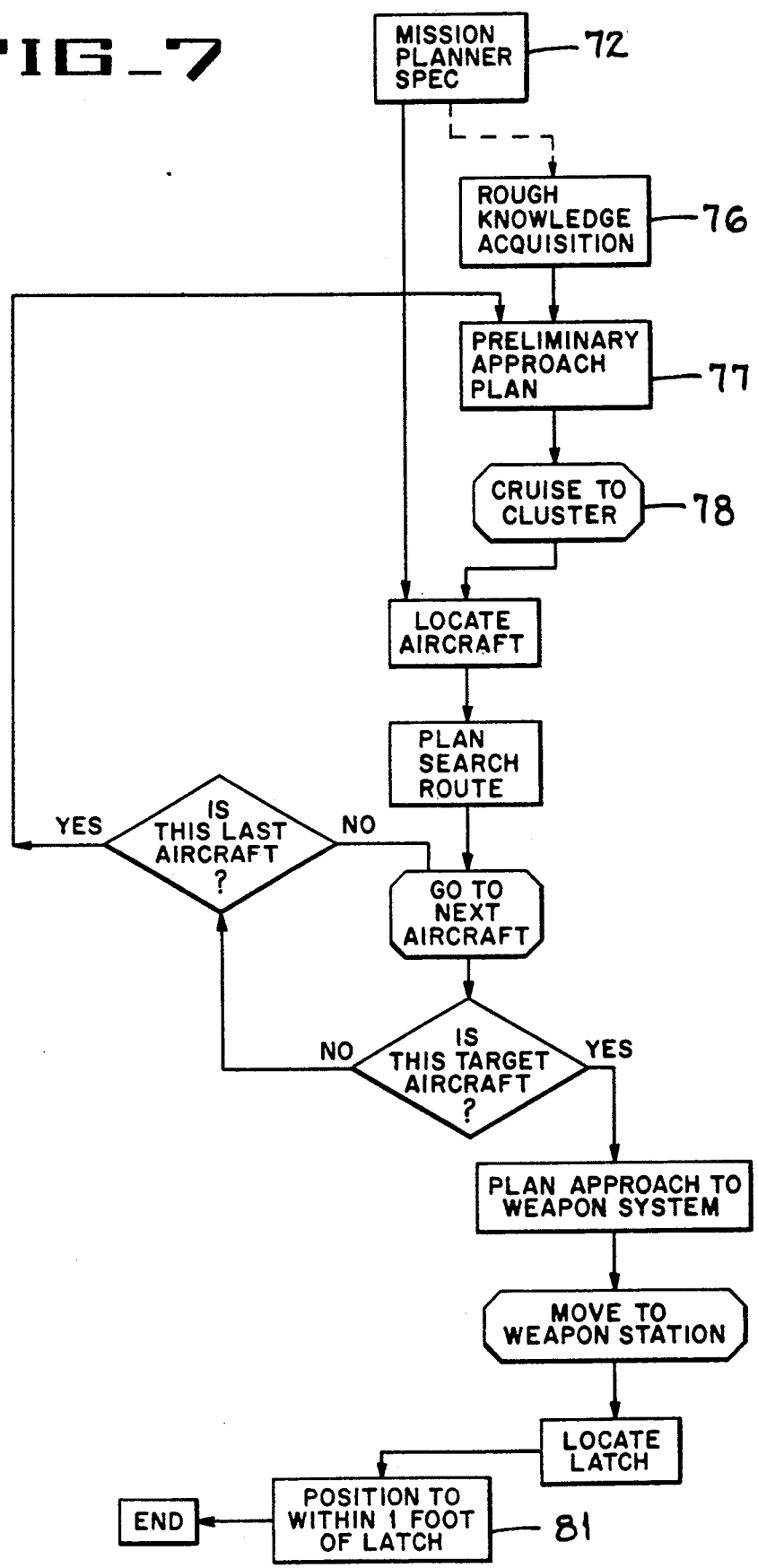

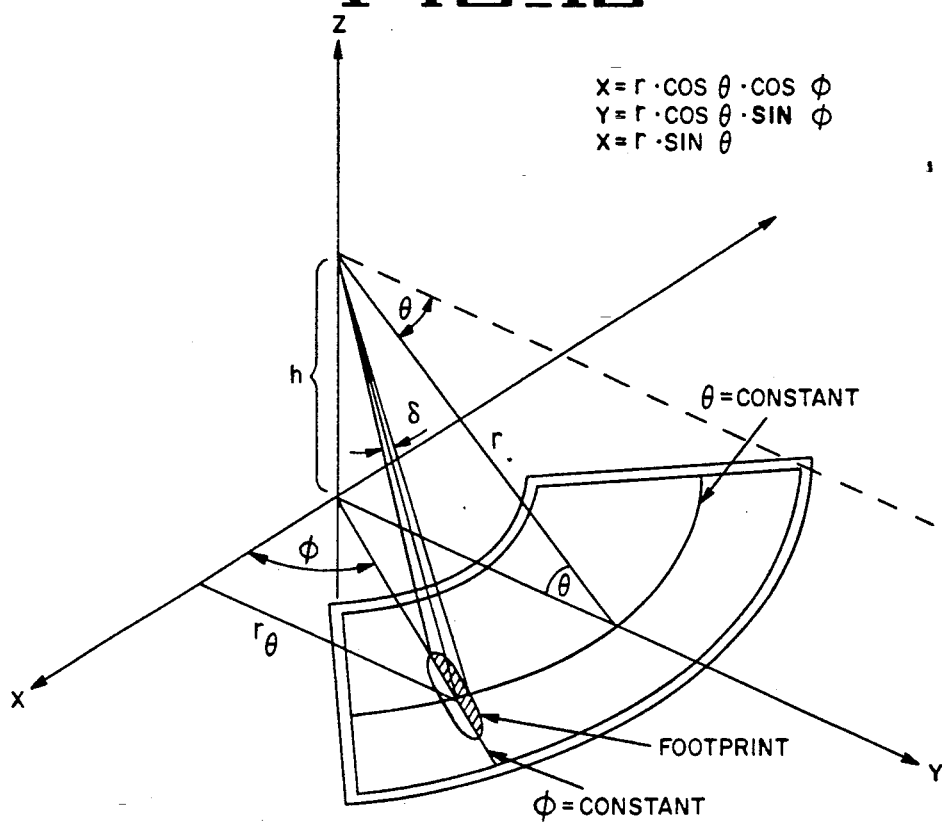
FIG_10
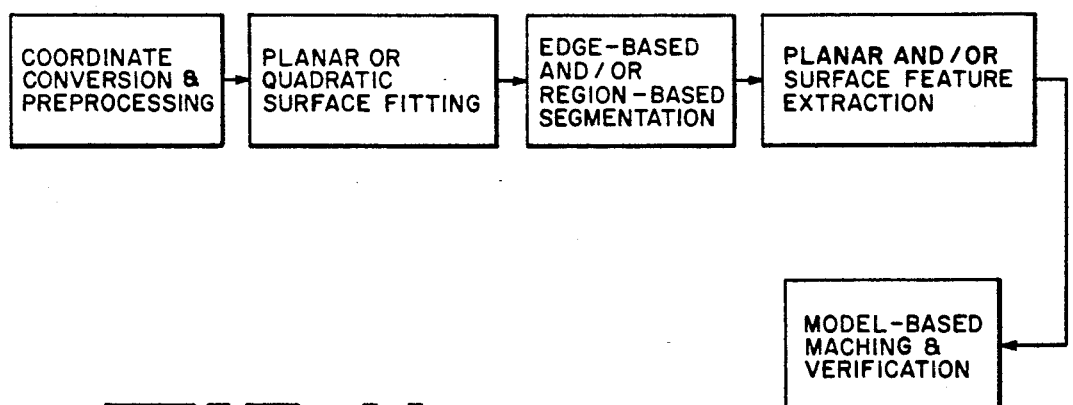
FIG_11

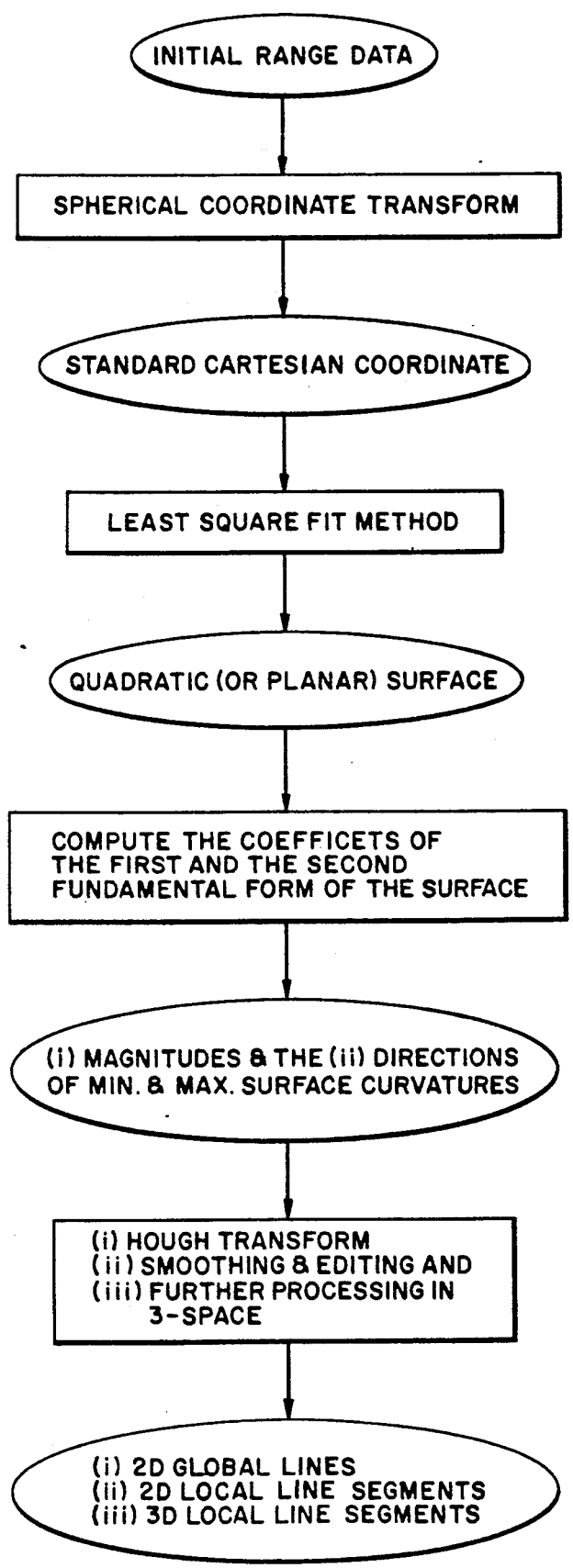

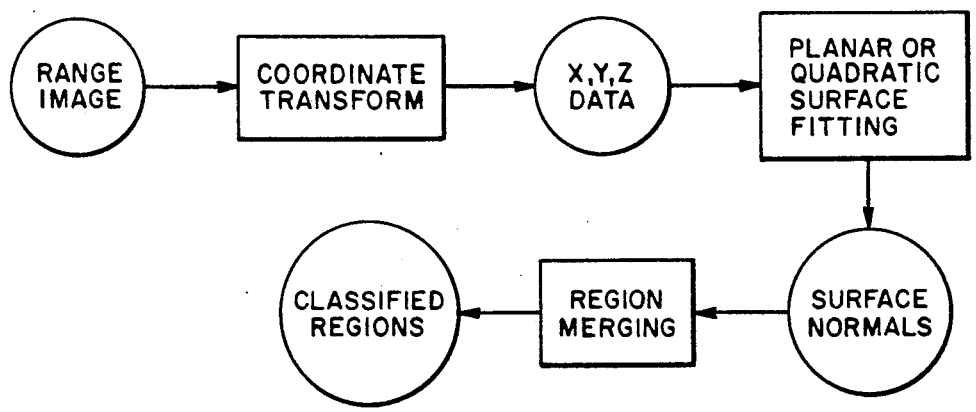
FIG_13
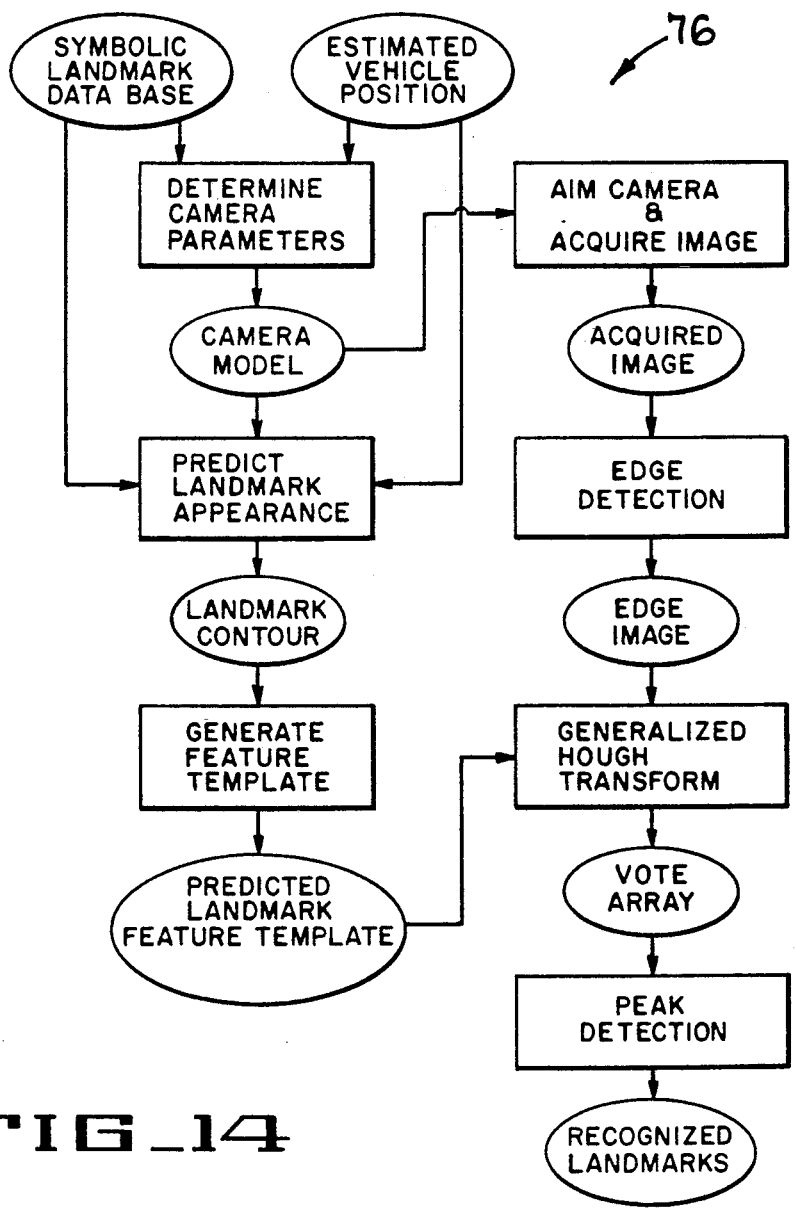
FIG_14

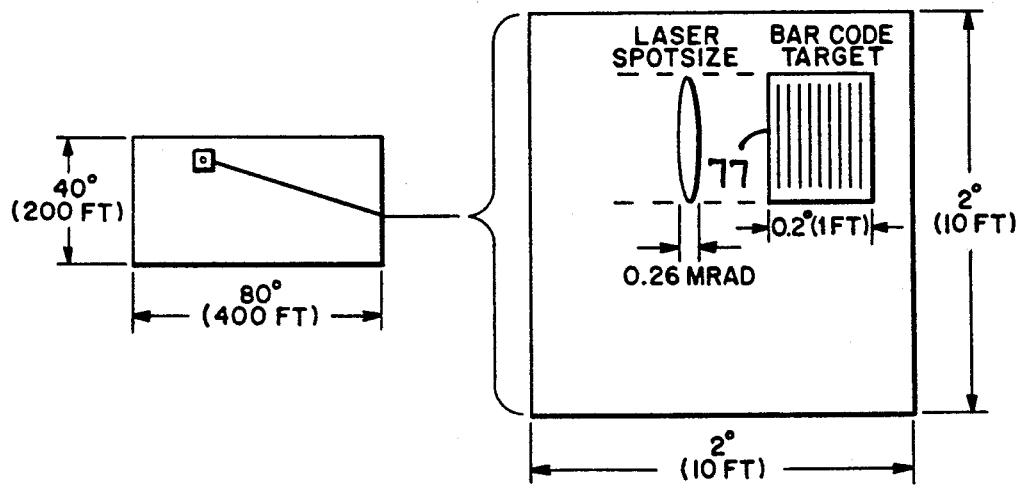
FIG_15
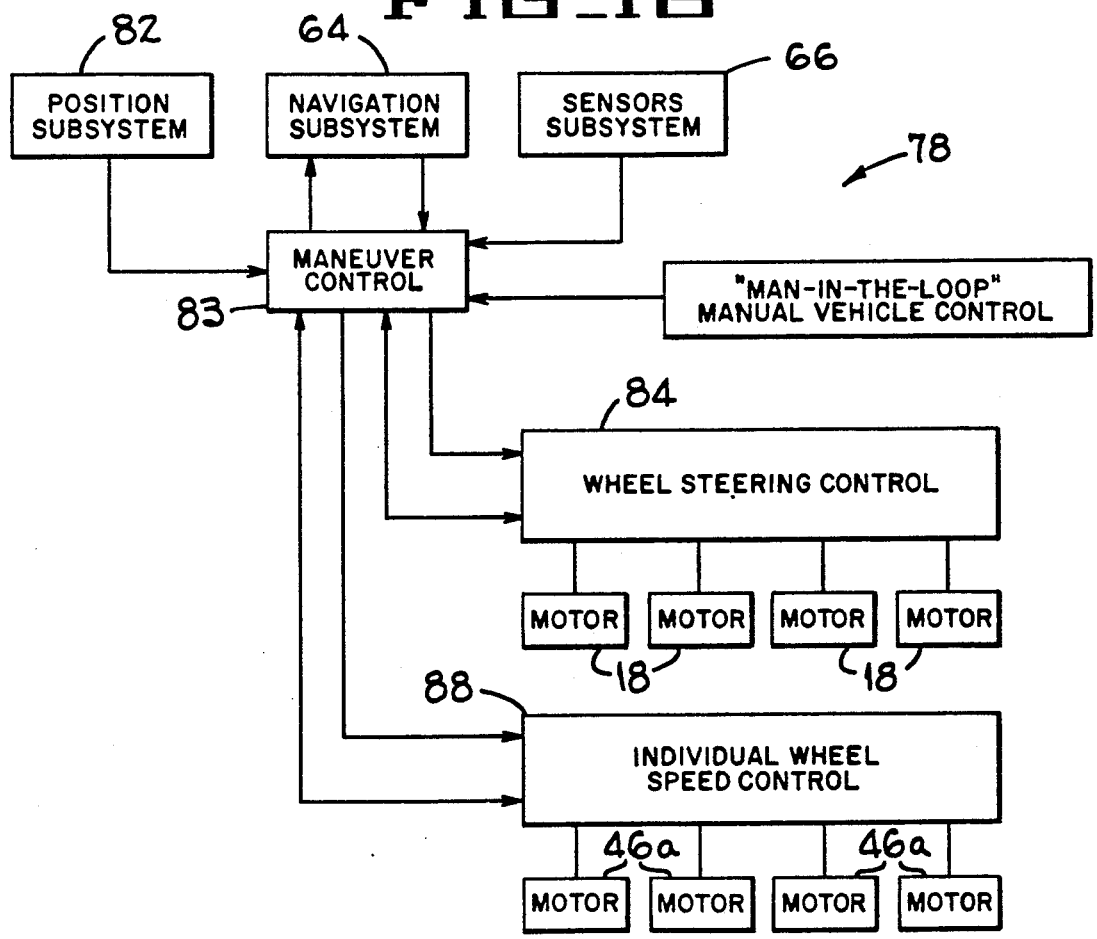
FIG_16

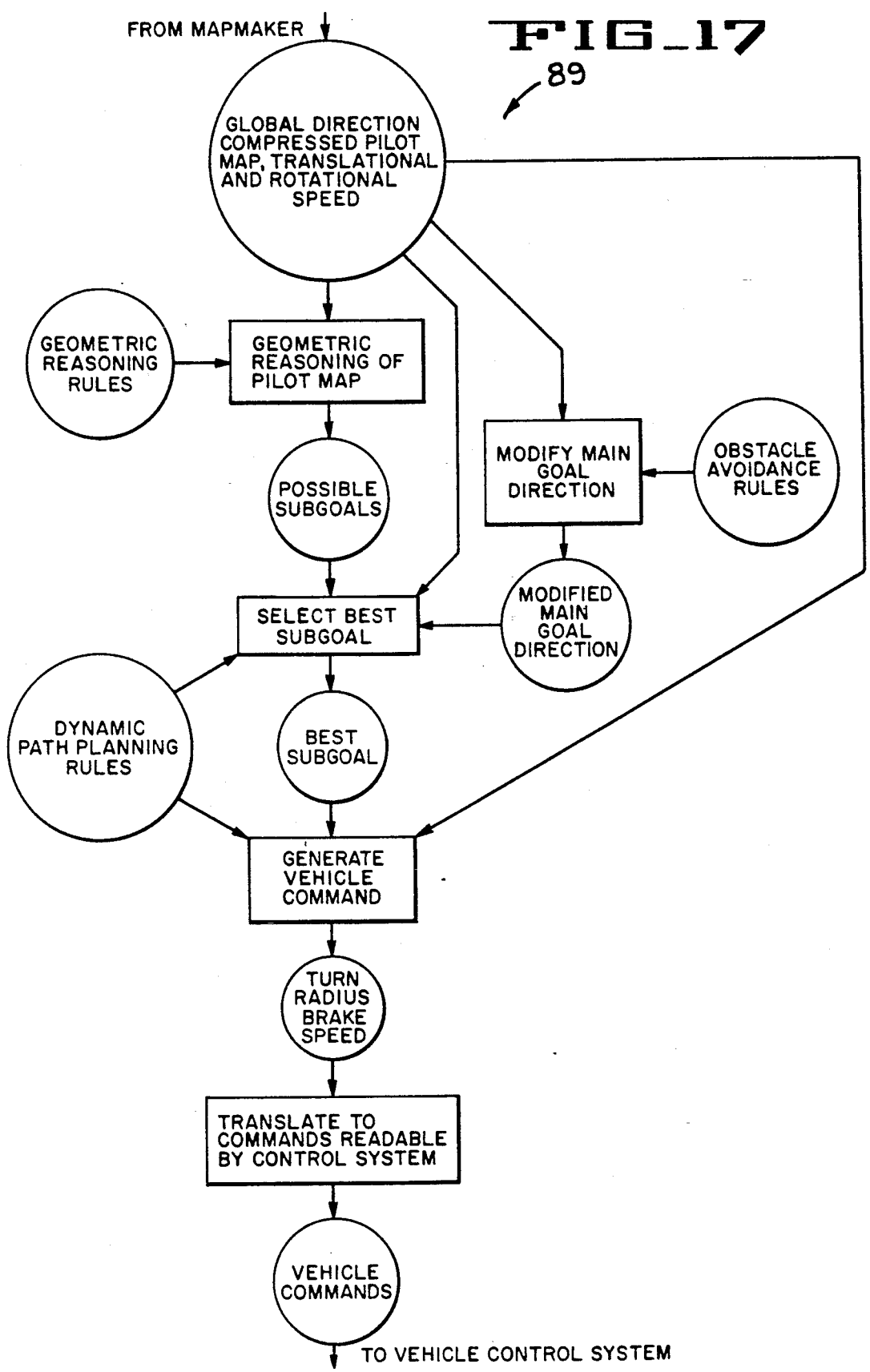

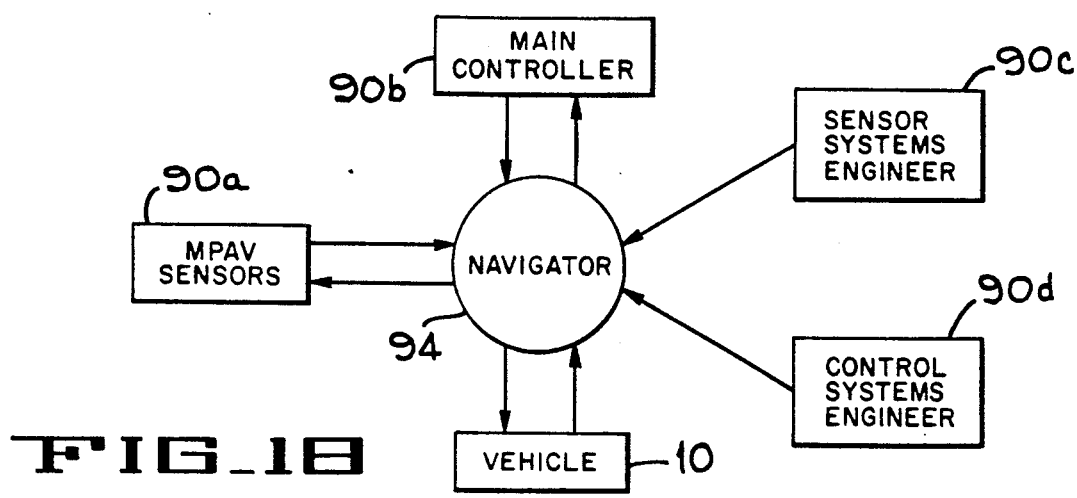
FIG_18
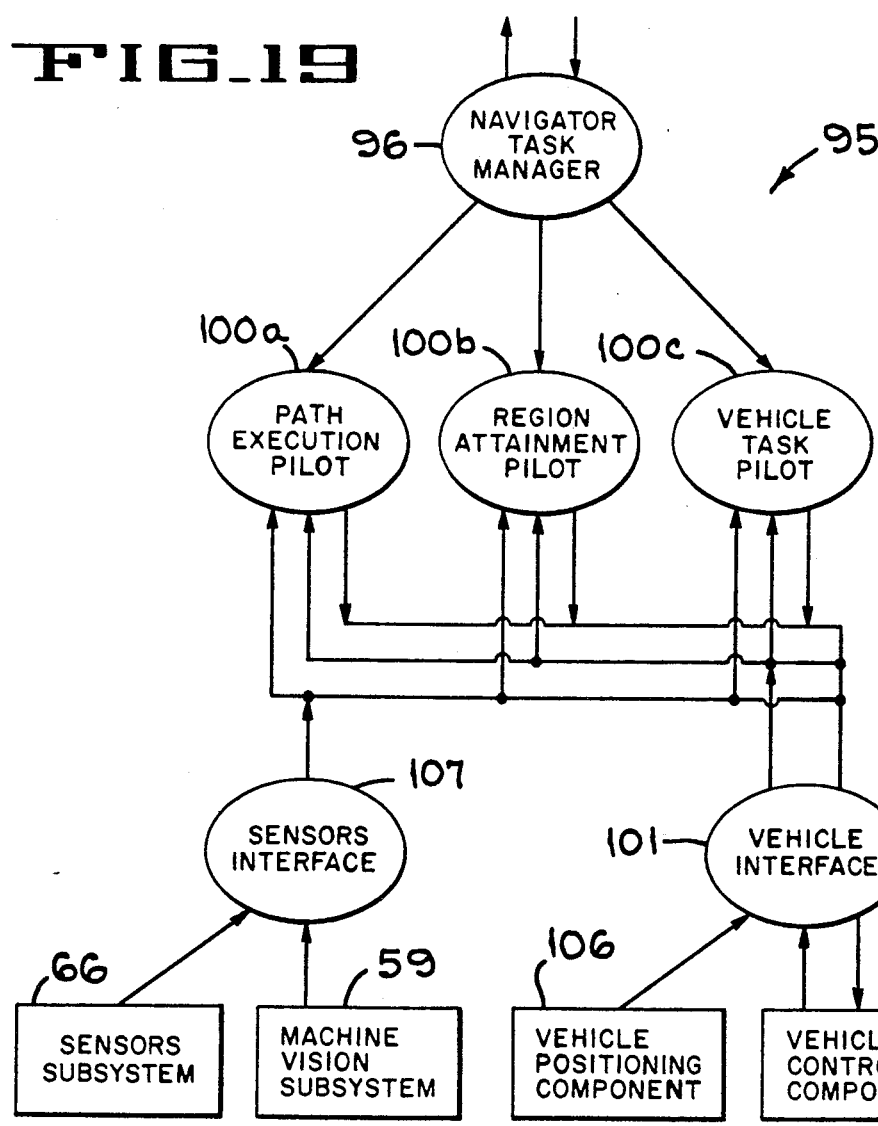
FIG_19

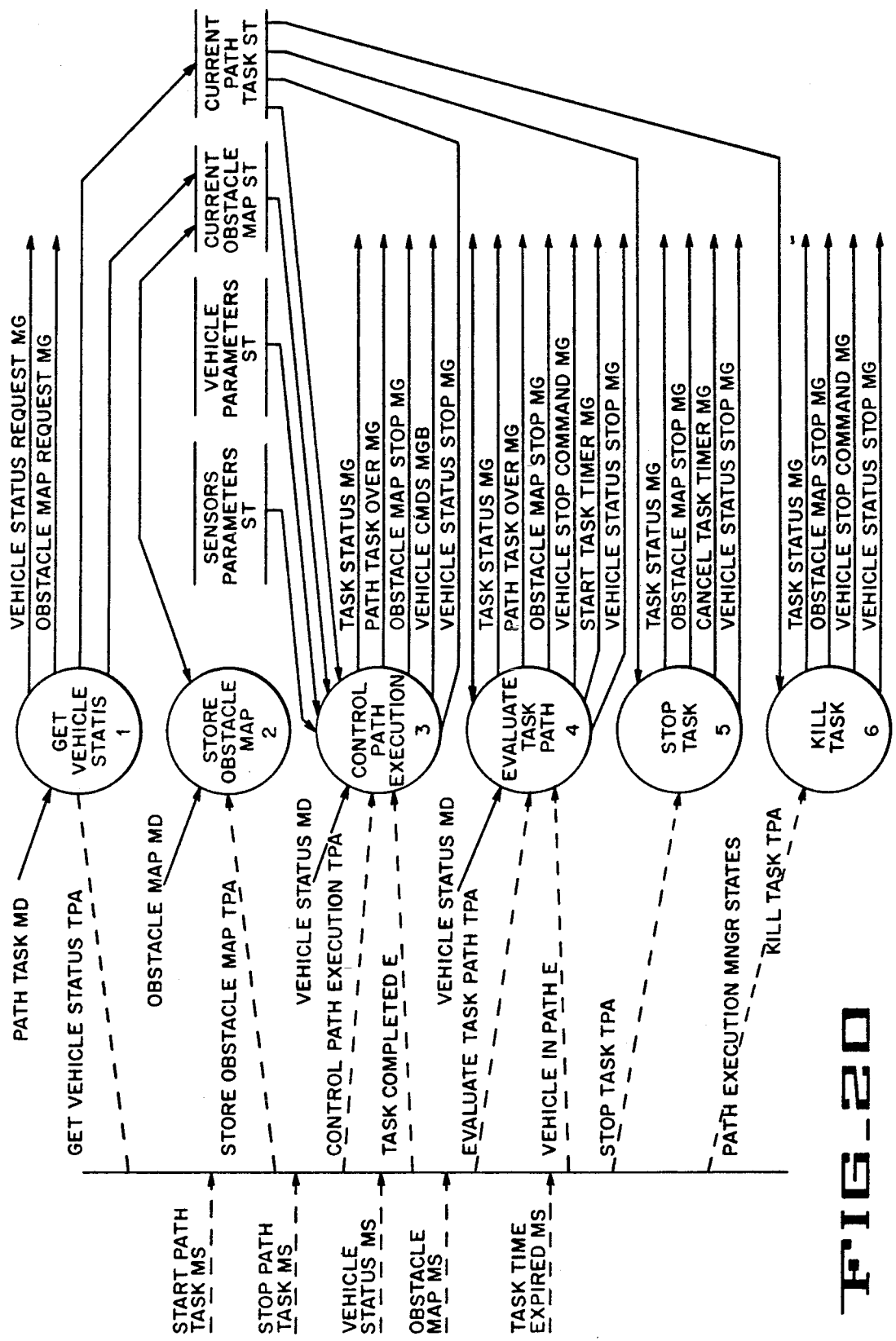

FIG_21
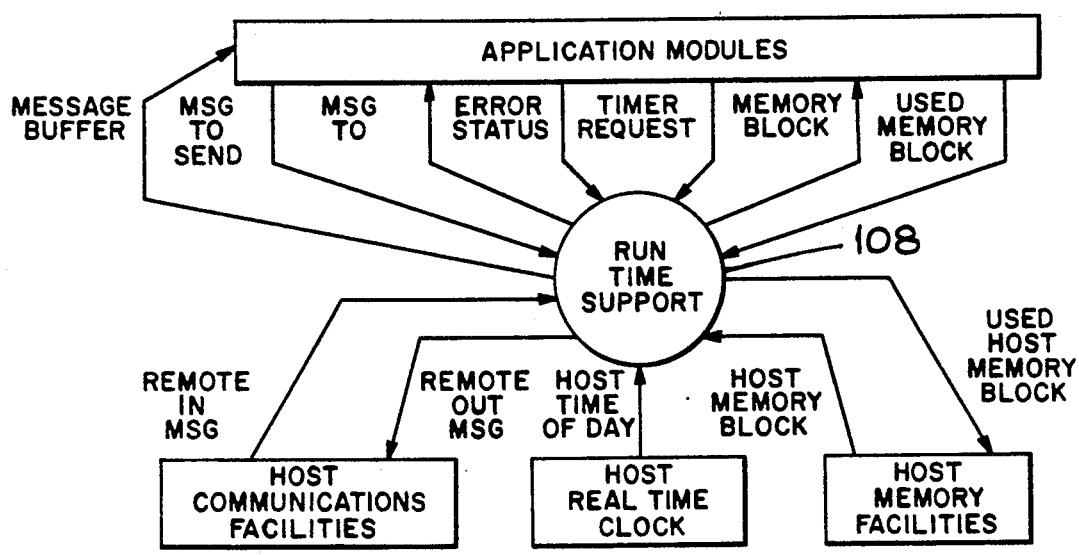
FIG_22
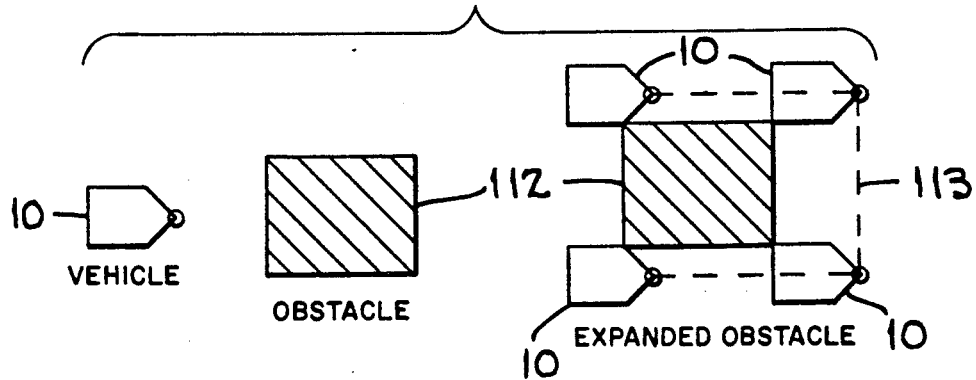

MULTI-PURPOSE AUTONOMOUS VEHICLE WITH PATH PLOTTING

This application is a continuation of application Ser. No. 07/521,851, filed May 7, 1990 now abandoned.

The present invention pertains to an autonomous vehicle, and more particularly, to an autonomous vehicle for operating in a predetermined physical work area while avoiding obstacles within the predetermined work area.

Autonomous vehicles are useful for operating in areas where it is dangerous for humans to operate, and for doing tasks which are repetitive and boring for humans. Some potential areas of use are in military applications such as operating military tanks, fighting fires near explosives and loading explosives onto vehicles or into guns.

SUMMARY OF THE INVENTION

The present invention discloses a multi-purpose autonomous vehicle for operating within a predetermined physical area such as on the deck of an aircraft carrier. The vehicle is able to receive material, such as a missile, from an ammunition magazine and deliver the material to an aircraft or to a local storage area. The vehicle is able to avoid obstacles on the deck of the aircraft carrier while moving along a most expedient route between the magazine and the aircraft. The vehicle is able to recognize a set of boundaries on the carrier deck and stay inside the boundaries.

The autonomous vehicle includes a generally rectangular body member having a plurality of individually suspended and individually steerable wheels connected to support and steer the vehicle. Means are provided for rotating each of the wheels to propel the vehicle along a supporting surface and for steering the vehicle by providing means for moving each of the wheels at least 360° about a generally vertically mounted pivot. Sensors detect obstacles about the vehicle and detect target areas to which the vehicle is to be directed. The sensors develop control signals which are applied to a control means which directs the vehicle to the targets while avoiding obstacles and keeping the vehicle inside boundaries mark on the supporting surface.

BRIEF DESCRIPTION OF THE DRAWINGS

FIG. 1 is an isometric drawing of a multi-purpose autonomous vehicle of the present invention.

FIG. 2 is a plan sectional view of the autonomous vehicle taken along line 2—2 of FIG. 3.

FIG. 3 is a side elevation of the vehicle of FIG. 1.

FIG. 4 is a block diagram of the system architecture of the vehicle of FIG. 1.

FIG. 5 is a state diagram disclosing the hierarchy of the various subsystems and controller used to operate the vehicle of FIG. 1.

FIG. 6 is a diagram of the machine vision subsystem hardware architecture.

FIG. 7 shows a sequence of tasks performed by a main controller subsystem in an autonomous vehicle.

FIG. 8 illustrates a method for separating obstacles from background scenery in an imaging system.

FIG. 9 illustrates a method for detecting dynamic obstacles.

FIG. 10 illustrates the scanning geometry of a basic laser scanner.

FIG. 11 is a block diagram of an object recognition module which uses sensor signals to recognize objects.

FIG. 12 illustrates the sequence of operation for determining the features of objects from edges of the objects.

FIG. 13 illustrates the sequence of operation for determining the features of an object from the surfaces of the object.

FIG. 14 is a landmark recognition module for using vehicle location and camera signals to recognize landmarks.

FIG. 15 illustrates the use of a laser for scanning a bar code target.

FIG. 16 is a block diagram of a four-wheel steer electric drive control system used in the present invention.

FIG. 17 describes the organization of the intelligent pilot used in the present invention.

FIG. 18 discloses the navigation subsystem for guiding an autonomous vehicle through a feasible path while avoiding unforeseen obstacles.

FIG. 19 is a block diagram of the navigation subsystem for the present invention.

FIG. 20 is a sample data flow diagram disclosing system analysis and design methodologies which have been used in developing the navigation system.

FIG. 21 discloses a run time support system used in the present invention.

FIG. 22 illustrates the expansion of the size of obstacles by an algorithm to account for the width of a vehicle which must avoid the obstacles.

DESCRIPTION OF THE PREFERRED EMBODIMENT

A multi-purpose autonomous vehicle 10 (FIGS. 1—3) includes a generally rectangular body member 11 supported by a plurality of steerable wheels 12 for movement of vehicle 10 about a deck D. The wheels are each rotatable about a horizontal axle 16 (FIGS. 1, 3) and are pivotable about a vertical pivot 17 (FIG. 2) by a steering motor 18 (FIG. 3) attached to a pulley 19. A belt 22 (FIG. 2) connects each motor pulley 19 to a larger pulley 23 mounted on the pivot 17 so each wheel 12 can be swiveled at least 360° about pivot 17 for steering vehicle 10 as wheels 12 rotate about axles 16.

A plurality of ultrasonic ranging sensors 24 (FIG. 1) mounted at spaced intervals about an upper portion of body member 11 detect the distance of obstacles around vehicle 10. Each of the sensors 24 includes a transmitter 24a (FIGS. 1, 3) for transmitting ultrasonic energy and a pair of receivers 24b for receiving reflecting energy. A plurality of infrared sensors 28 provide redundant distance sensing of objects, and are especially useful in detecting objects having sound-absorbing surfaces. A pair of CCD cameras 29 each swivelly connected to a vertical wall 30 by a bracket 33 provide visual sensing of objects. A plurality of touch sensors 34 are mounted on a bumper 35 extending around vehicle 10 for sensing objects near the vehicle. A scanning laser 36 and a laser identification bar code sensor 37 are mounted on a front portion of vehicle 10.

A motor controller compartment 38 (FIG. 2) and a computer compartment 39 are positioned along opposite sides of body member 11, and a battery tunnel 40 extends along the length of the center of body member 11. A plurality of batteries (not shown) mounted in tunnel 40 provide power for all operations of vehicle 10 including power to drive the vehicle wheels 12 and to power computers and controllers which are used to operate vehicle 10. A plurality of generally U-shaped brackets 44 (FIGS. 1, 3) mounted on a top portion of body member 11 provide support for a pay load 45, such as an explosive missile. A wheel hub 46 (FIG. 3) on each wheel 12 includes a propulsion motor, reducer, brakes and wheel bearings, all packaged in hub 46. Such a wheel hub is available from Unique Mobility, Inc., Englewood, Colo. The motor includes a three-phase brushless design having high power density and high motor efficiency.

A multi-purpose autonomous vehicle system architecture (FIG. 4) includes a main controller 49, a vehicle controller 50 and a plurality of processors 51a-51f connected to a VME bus 54 and to a plurality of sources of signals, such as camera 29 and sensors 24, 28, 34. A keypad and display 55 is used to program commands into controller 49 and a manual control 56 can be used for emergency control of vehicle 10.

A high level partitioning of the multi-purpose autonomous vehicle with the subsystem interfaces is shown in FIG. 5. A machine vision subsystem 59 includes a high-resolution scanning laser ranger 36 (FIG. 4) operating at video frame rates and a video camera 29 coupled to high speed image processing processors 51d, 51e. The high speed laser ranger (Real Time Imaging Ranger) uses a high speed serial scan technology having a range of 50 meters with a 90° horizontal and a 40° vertical field of view. Subcarrier modulation provides high resolution down to a distance of two feet, and provides more coarse resolution up to a distance of fifty meters by the same sensor. Machine vision algorithms use range data for static and dynamic obstacle detection and avoidance, and for recognition of aircraft, weapon station, latch opening and boundaries of the flight deck, and use, video data for white line detection and object feature detection when range data alone is not sufficient. Fast algorithms provide obstacle detection and avoidance and slower algorithms provide recognition of objects using their geometrical shape and the shape of object parts. Surface curvatures are computed using edges and surface normals. White line and flight deck boundaries detection use video information and imaging processing algorithms with edge detector and transform techniques.

A four-wheel steering subsystem 60 (FIG. 5) uses a vehicle controller 50 (FIG. 4) to provide power for propelling and steering vehicle 10. The subsystem includes batteries with sufficient power for eight hours of operation. The vehicle control electronics interface to motors and actuators to implement control functions such as pivot, lateral movement or trajectory following. The manual control 56 can be used to operate vehicle 10 if the automatic system fails. The ability of the wheels to each steer about a 360° vertical pivot allows vehicle 10 to do a stationary or moving turret rotation, to crab sideways, turn corners while always heading in a constant direction and perform a variety of other maneuvers.

The machine vision subsystem 59 (FIG. 5) provides a main controller subsystem 61 with the identity and location of objects and their particular prominent features. Machine vision subsystem 59 provides a navigation subsystem 64 with the current location, speed and direction of obstacles, and the identification and location of aircraft, white lines, deck edges, weapon station and latch opening. Vision subsystem 59 senses obstacles and other objects in a field of view, understands what is being sensed and takes appropriate action as programmed. Intensity and color images from cameras 29 are used to recognize specific objects or some of their features.

A laser identification subsystem 65 (FIG. 5) uses real time laser scanner 36 (FIG. 1) to detect and identify objects nearby. A bar code sensor 37 provides wide-angle search and narrow-angle bar code scan. The subsystem includes an electro-optically modulated laser transmitter, a receiver, and a pair of x-y scanners, with the associated optics and electronics mounted on a pan-tilt mechanism to permit pointing the system toward the area of interest. The receiver includes means for tracking targets and for ranging and bar code reading. The system includes wide-angle search, narrow-angle bar code scan and is capable of detecting, reading and determining the range to retroreflector and reflector-type bar codes at distances up to 300 feet with a 80°H×40°V field of view. Details of laser scanner 36 subsystem 65 are disclosed in U. S. patent application Ser. No. 268,337 by James Kerr et al, entitled "Imaging Range Finder and Method".

A sensor subsystem 66 (FIG. 5) includes a plurality of ultrasonic transmitters 24a (FIG. 1), and sensor-receivers 24b, each with a 30° field-of-view spaced about the perimeter of vehicle 10. Sensor signals are processed to generate a global depth map to a distance of 70 feet and a velocity field of the scene. Redundancy to the ultrasonic sensors is provided by a plurality of amplitude modulated infrared LED sensors 28 placed on the corners of vehicle 10. These infrared LEDs use a shift in phase between transmitted and received signals to provide high-resolution data for ranges between one foot and twenty feet at a rapid rate. A final level of redundancy for obstacle avoidance is provided by strips of pressure-sensitive piezoelectric polymer film in touch sensors 34 (FIGS. 1-3). Sensors 34 provide extreme short range accurate distance information for precise maneuvering, docking, and emergency stopping.

The machine vision subsystem hardware shown in FIG. 6 includes cameras 29, real-time imaging ranger (RTIR) 36, a pair of processors 51e, 51f, a plurality of transputer multiprocessors 70 and a plurality of Datacube imaging processors 71a-71d. RTIR 36 provides static and dynamic detection and avoidance of obstacles and recognition of other objects. Low-level data-driven computationally intensive range image processing is implemented on transputer multiprocessor 70 using parallel algorithms to achieve processing speed required for real-time vehicle operation. The high-level model-matching and verification algorithms are performed on processor 51f. Video cameras 29 are connected directly to Datacube processors 71a-71d to perform the low-level image processing tasks. High-level video imaging is performed on processor 51e, and all hardware is linked to the VME bus 54.

The main controller subsystem 61 (FIG. 5) includes software that decomposes the mission into.. a sequence of tasks. A mission planner 72 (FIG. 7) accepts operation data such as aircraft and weapons identification, and activates mission execution. A knowledge acquisition module 76 incorporates rough knowledge into world knowledge. An approach plan module 77 plans cluster sequence, and plans a path to a next cluster. A module 78 instructs the navigation subsystem 64 (FIG. 5) to execute a path, monitor and report results. A module 81 instructs planner 72 to plan a path to a hatch latch. The labels in the other modules of FIG. 7 define the types of operations of these modules.

An obstacle/background separation method shown in FIG. 8 uses the difference of range derivatives between the background and the actual range image. The theoretical background derivatives and the actual range derivatives with respect to the vertical scan angle, can be computed as follows:

Let $R_\theta$ and $r_\theta$ be the range derivatives with respect to a vertical scan angle $\theta$ (FIG. 10), in the background and actual range images respectively. Let h be the height of the scanner from the floor. From FIG. 10, range R to a point (i, j), where i and j correspond to the row and column respectively, for flat ground is, $$R = \frac{h}{\sin \theta}$$

Differentiating with respect to $\theta$,
$R_\theta = -h \cdot \csc\theta \cdot \cot\theta$ or, $R_\theta = -R \cdot \cot\theta$ The value of $r_\theta$ at any point (i,j) can be directly computed from the range image obtained from the laser scanner as follows: If row i is farther from the scanner than row (i+1) then, $$r_\theta[i][j] = (r[i-1][j] + r[i-2][j]) - (r[i+1][j] + r[i+2][j])$$

Let, $\Delta_\theta = r_\theta - R_\theta$

The values of $(r_\theta - R_\theta)$ are not computed because the range derivatives with respect to the horizontal scan angle $\phi$ will have a value of zero for a spherical coordinate scanning geometry.

Setting a low threshold value for $\Delta_\theta$, the obstacle and background regions can be determined. Extending this method determines the vertical and horizontal surfaces of the objects based on the fact that the value of $r_\theta$ is positive for horizontal surfaces and is negative for vertical surfaces of the object. This method cannot determine if an object is moving or is stationary.

Motion of an object can be detected by determining the difference between the ith and (i+n) th range images, where n is a positive integer and depends upon the frame rate, processing speed and the velocity of vehicle 10 (FIG. 1). For computing the frame difference, the ith frame is projected onto the (i+n) th frame and "position difference" of the same point in the new and old frames is determined. The projection transform to project the ith frame onto the (i+n) th frame is a function of ($\Delta\phi$, $\Delta\theta$, $\Delta x$, $\Delta y$). Here and $\Delta\phi$ and $\Delta\theta$ are the offsets to be added to the previous $\phi$ and $\theta$ in order to determine a point of the ith frame in the (i+n) th frame, and $\Delta x$ and $\Delta y$ are the change in the position of vehicle 10 from frame i to frame (i+n). If the "position difference" is substantial then the point belongs to a moving obstacle, otherwise the point belongs to a static obstacle or to the background. This approach is illustrated in the flow chart of FIG. 9.

Object recognition algorithms are used to recognize and determine the location of the flight deck, particular aircraft, a particular weapon station on the aircraft and a latch opening with respect to vehicle 10 (FIG. 1). FIG. 11 illustrates the following sequence of steps used to recognize objects:

1. Convert range data from a sensor-based coordinate system to standard Cartesian coordinates.

2. Fit a quadratic (or planar) surface to the neighborhood of each range pixel, using a least square method.

3. Based on this fit, the noise model, the range resolution and the objects to be identified, either the edge-based or the region-based segmentation can be chosen or both edge-based and region-based segmentation can be used for robust feature detection.

4. Extract linear and surface features using Hough transform and blob labeling algorithms respectively.

5. Apply a model-based matching algorithm using the noise model to identify the objects.

The first step (FIG. 11) is to convert range data from the sensor-based (or spherical) to the standard cartesian coordinate system. Given the initial pan and tilt angles of the scanner, the horizontal and vertical fields of view and the rows and columns in the image, it is straight forward to convert (r, $\theta$, $\phi$) into (x, y, z) at each range pixel.

The next step is to fit a general quadratic model to sets of data points using a "best" fit method. The general quadratic equation at point ($x_i$, $y_i$) can be written as:

$$z_i = a + bx_i + cy_i + dx_i^2 + ex_iy_i + fy_i^2$$

The surface for which the squared error in fit is a minimum is found. The squared error is defined to be:

$$E^2 = (a + bx_i + cy_i + dx_i^2 + ex_iy_i + fy_i^2 - z_i)^2$$

With a neighborhood of k points the total square error for the region is:

$$E^2 = \sum_{i=1}^{k} (a + bx_i + cy_i + dx_i^2 + ex_iy_i + fy_i^2 - z_i)^2$$

The parameters of the quadratic surface can be found by setting the derivatives of the squared error to zero with respect to the parameter. This results in six equations in six unknowns which can be solved for the parameters of interest.

A method of edge detection and linear feature extraction is shown in FIG. 12 as a sequence of steps which detects three-dimensional boundaries. Range data is converted from spherical to Cartesian coordinates and a quadratic or planar surface is fitted to the neighborhood of each range pixel using the least square fit method. Using this fit, minimum and maximum principal surface curvature are computed at each pixel to detect edges. Next, using Hough transform techniques, three-dimensional line segments are detected. Edges can be detected by using surface curvature to define surface characteristics. When a surface is defined as the locus of a point whose coordinates are functions of independent variables u and v, then surface curvature is invariant under u, v parameterization. Surface curvature is also invariant under 3D translations and rotations. A method of curvature approximation can be used to estimate surface curvatures using a planar equation as follows:

$$z_i = a + bx_i + cy_i \text{ at point } (x_i, y_i)$$

When curvature exceeds a predetermined threshold value the range pixel is determined to be an edge pixel.

The Hough transform is used to find 2D global lines and the 2D global lines are segmented, based on edge density, into 2D local line segments. These 2D local line segments are further processed in three-dimensional space to extract 3D local line segments.

FIG. 13 illustrates a region-based approach for extracting surface information to recognize the wheels of an aircraft or surface features of prominent parts of a weapon station. Range data is first converted from spherical to standard Cartesian coordinates. A quadratic or planar surface is then fitted to the neighborhood of each range pixel using the least square fit method. Based upon this fit surface normals are computed, and patches with similar surface normals are merged into a region.

When range data does not provide complete information such as color or reflectance, video information is used to complement the range information. A landmark recognition module 76 (FIG. 14) includes a landmark data base containing a set of possible landmarks indexed by locations and by types of landmarks. The landmarks are represented by their geometric models. A landmark prediction model uses vehicle location, camera models, and the landmark data base to predict the appearance of landmarks viewed from the current vehicle location. A landmark recognition module uses the predicted appearance of a landmark to guide the image feature extraction process for landmark recognition. After selecting a suitable landmark for vehicle 10 (FIG. 1) module 76 calculates the appropriate pan, tilt and zoom parameters to control the camera for image acquisition. The landmark outline in the acquired image is predicted based on current camera parameters, vehicle and landmark locations and the geometric model of the landmark. This outline is then used to generate a landmark feature template to drive the generalized Hough transform algorithm for landmark recognition. A Hough vote image is generated based on the match between edge point and landmark template.

Laser identification system 36a (FIG. 1) is used to identify aircraft and other objects by use of a bar code target 77 (FIG. 15). Main controller 61 (FIG. 5) assigns tasks to laser identification subsystem 65, such as looking for a specific bar code and noting its bearing, range and code. Laser subsystem 65 develops coded signals containing the bearing and range of the bar code target and sends the coded signals to navigation subsystem 64 when requested to do so by subsystem 61. Laser subsystem 65 also sends range maps of a weapon station latch opening to subsystem 61 in response to such a request.

A vehicle speed and steering control system 78 (FIG. 16) includes a position subsystem 82, sensor subsystem 66 and navigation subsystem 64. These subsystems 64, 66, 82 provide control signals to a maneuver control processor 83. Processor 83 provides position signals to an individual wheel steering control 84 and velocity signals to an individual wheel speed control 88. Steering control 84 provides power for individually operating each of a plurality of steering motors 18 (FIGS. 1, 2 and 16). Wheel speed control 88 provides power for propelling each of a plurality of motors 46a, where each motor 46a is included in one of the wheel hubs 46 (FIG. 2). Controls 84 and 88 are available from Unique Mobility, Inc., Englewood, Colo.

The navigation subsystem 64 (FIG. 5) collects and integrates all sensor data from sensor subsystem 66. Navigation subsystem 64 sends the vehicle trajectory description consisting of speed, path in space, and headings to four-wheel steering subsystem 60 for execution. Navigation subsystem 64 receives signals from machine vision subsystem 59 and from laser identification subsystem 65 and uses these signals to determine the location and heading of vehicle 10 (FIG. 1) on flight deck D.

An intelligent pilot 89 (FIG. 17) is capable of guiding vehicle 10 (FIG. 1) around obstacles while staying within guide lines on a flight deck or other path borders. Pilot 89 uses heuristic geometric reasoning and search techniques to process a local map that is a compression of the local segment of the global path. Real-time processing of sensor based obstacle information and geometric reasoning that considers the vehicle dynamic model are featured. The local free space is represented by a compressed map and local paths can be planned utilizing incomplete sensor information. Heuristic obstacle avoidance rules are used and subgoal selection is close dynamic coupled with vehicle behavior.

Navigation subsystem 64 (FIG. 5) is capable of guiding an autonomous vehicle 10 (FIG. 1) through a dynamically feasible path while avoiding unforeseen obstacles and observing global path boundaries and constraints. A plurality of interfaces 90a-90d through which a navigator 94 receives the global path, sensor data, and vehicle status is shown in FIG. 18. Each global path received by navigator 94 represents a navigation task which will be executed to completion or until a new global path is received. The paths are represented as a contiguous series of polygonal free space segments where each segment describes the free space through which vehicle 10 (FIG. 1) can navigate while satisfying the initial constraints of maximum speed, go and no-go regions, etc. Each path segment uses a path description language to describe constraints of path borders, global direction and obstacles as high-level composite functions acting on the sensor data. Each segment also contains predicates specifying the conditions under which the description applies.

A navigation subsystem 95 (FIG. 19) comprises a hierarchical organization of cooperative function-specific modules with interfaces between modules based on a message passing scheme that maximizes the functional and data decoupling of the system modules. Modules can be easily added, modified, or removed from the system with minimum impact on other modules. A navigation task manager module 96 receives global paths from main controller 49 (FIG. 4) and based on the nature of the path received, activates one of a plurality of dedicated pilots 100a-100c (FIG. 19) to execute the task. Task manager 96 continuously reports the progress of the path to main controller 49 (FIG. 4). Each global path received invokes a navigation task, with only one active at any given time. Reception of a new global path causes the current task to be aborted and the new task to be executed.

Path execution pilot 100a (FIG. 19) executes global paths for which a multisegment path is specified and where the path goal is defined as a line across the last path segment. When vehicle 10 (FIG. 1) crosses the goal line the path is completed. Region attainment pilot 100b provides finer control of the vehicle. Pilot 100b receives a single segment path in which the goal is defined as a circular region having a center and a diameter specified in the global path. Vehicle task pilot 100c provides for vehicle stop, vehicle rotation and other low level tasks as directed by manager 96. A vehicle interface 101 receives vehicle trajectories from pilot 100a and passes them to a vehicle control component 102 for execution. Interface 101 also receives continuous status information from component 102 and from a vehicle positioning component 106 and consolidates this information into a vehicle status message containing vehicle linear and angular speeds, vehicle position and vehicle heading. This vehicle status message is available to the modules in subsystem 95. A sensor interface 107 receives obstacle maps from sensor subsystem 66 and machine vision subsystem 59 and fuses these maps into a unified obstacle map for use by modules in subsystem 95.

FIG. 20 illustrates data flow in the vehicle navigation subsystem. A navigation subsystem code developed in C language is designed for portability. A run time support system 108 shown in FIG. 21 provides the system level services required by the navigation subsystem application code. System 108 can be used to interface with a host operating system or system 108 can be operated as a stand-alone system.

When the vehicle 10 (FIG. 1) operates on the flight deck D of a moving aircraft carrier a vehicle positioning system is used that is a combination of dead reckoning and position triangulation. The dead reckoning system delivers accurate position and heading data over short traversals and the triangulation system based on the laser identification subsystem is used to obtain position fixes to recalibrate the dead reckoning system at periodic intervals. The position fixes are made by using the laser identification subsystem 65 (FIG. 5) to locate a plurality of corner cube retro-reflectors or bar coded reflectors 77 (FIG. 15) distributed around the carrier flight deck. The bearing and range to two or three of these reflectors are used by subsystem 65 to determine the relative vehicle position and vehicle heading. If needed, bar coded reflectors can be attached to the surface of the flight deck and a bar code reader installed on the bottom portion of vehicle 10 to detect these reflectors.

In FIG. 22 vehicle 10 must be steered around an obstacle 112 using polygonal regions to represent forbidden areas of travel. To account for the width and length of vehicle 10 a forbidden area 113 includes obstacle 112 plus known dimensions of vehicle 10. This can be computed using the circuit of FIG. 4.

The multi-purpose autonomous vehicle detects targets, obstacles and operating boundaries using a plurality of sensors to develop control signals. A plurality of processors and controllers use the control signals to direct the vehicle to a target over the best route while avoiding any obstacles enroute to the target. A plurality of laser, optical and sonic generators transmit energy which is reflected to the sensors by nearby targets and by other objects.

Although the best mode contemplated for carrying out the present invention has been herein shown and described, it will be apparent that modification and variation may be made without departing from what is regarded to be the subject matter of the invention.

What is claimed is:

1. A multipurpose autonomous vehicle for traveling to a desired location while avoiding moving and non-moving obstacles, comprising:
    a body member;
    a plurality of wheels;
    means for propelling and steering the body member by rotating the plurality of wheels;
    a plurality of sensors mounted on the body member, which produce sensor signals;
    a machine vision subsystem mounted on the body member, for receiving the sensor signals and interpreting the sensor signals and outputting a detection signal indicating the presence of an object;
    a main controller subsystem mounted on the body member, for receiving a plurality of input signals;
    a navigational subsystem mounted on the body member, comprising;
        a means for receiving, as input, signals from the machine vision subsystem;
        a means for receiving, as input, signals from the main controller subsystem;
        means for plotting a map from the received signals;
        means for plotting a path from the initial location of the vehicle to a desired location;
        means for sending control signals to control the means for propelling and steering the body member along the plotted path; and
        means for continuously monitoring signals from the machine vision subsystem and the present location of the vehicle and for determining whether an object is blocking the plotted path of the vehicle, and wherein the means for plotting a path provides a means for plotting a new path from the present location of the vehicle to the desired location to avoid the object; and
    a means for determining if an object is moving, while the autonomous vehicle is moving, and wherein the means for plotting a path provides a means for plotting a path and speeds for avoiding moving objects.

2. A multipurpose autonomous vehicle, as claimed in claim 1, wherein the means for plotting a path provides a means for plotting a path within path boundaries and constraints.

3. A multipurpose autonomous vehicle, as claimed in claim 1, wherein the means for plotting a path further comprises a means for performing heuristic geometric reasoning and search techniques and wherein the means for plotting a map comprises a means for plotting a three dimensional map from the received signals.

4. A multipurpose autonomous vehicle for traveling to a desired location while avoiding moving and non-moving obstacles, comprising:
    a body member;
    a plurality of wheels;
    means for propelling and steering the body member by rotating the plurality of wheels;
    a plurality of sensors mounted on the body member, which produce sensor signals;
    a machine vision subsystem mounted on the body member, for receiving the sensor signals and interpreting the sensor signals and outputting a detection signal indicating the presence of an object;
    a main controller subsystem mounted on the body member, for receiving a plurality of input signals; and
    a navigational subsystem mounted on the body member, comprising;
        a means for receiving, as input, signals from the machine vision subsystem;
        a means for receiving, as input, signals from the main controller subsystem;
        means for plotting a map from the received signals;
        means for plotting a path from the initial location of the vehicle to a desired location;
        means for sending control signals to control the means for propelling and steering the body member along the plotted path; and
        means for continuously monitoring signals from the machine vision subsystem and the present location of the vehicle and for determining whether an object is blocking the plotted path of the vehicle, and wherein the means for plotting a path provides a means for plotting a new path from the present location of the vehicle to the desired location to avoid the object, wherein means for plotting a path comprises, memory for storing information describing a general area containing the desired location where a desired bar code is located, and wherein the navigational subsystem further comprises a means for searching for the desired bar codes, and wherein the plotting means further comprises a means for plotting a path to the general area and then to the desired bar code.

5. A multipurpose autonomous vehicle for traveling to a desired location while avoiding moving and non-moving obstacles, comprising:
   a body member;
   a plurality of wheels;
   means for propelling and steering the body member by rotating the plurality of wheels;
   a plurality of sensors mounted on the body member, which produce sensor signals;
   a machine vision subsystem mounted on the body member, for receiving the sensor signals and interpreting the sensor signals and outputting a detection signal indicating the presence of an object;
   a main controller subsystem mounted on the body member, for receiving a plurality of input signals; and
   a navigational subsystem mounted on the body member, comprising;
      a means for receiving, as input, signals from the machine vision subsystem;
      a means for receiving, as input, signals from the main controller subsystem;
      means for plotting a map from the received signals;
      means for plotting a path from the initial location of the vehicle to a desired location;
      means for sending control signals to control the means for propelling and steering the body member along the plotted path; and
      means for continuously monitoring signals from the machine vision subsystem and the present location of the vehicle and for determining whether an object is blocking the plotted path of the vehicle, and wherein the means for plotting a path provides a means for plotting a new path from the present location of the vehicle to the desired location to avoid the object; and
   a plurality of batteries electrically connected to the means for propelling and steering, the plurality of sensors, the machine vision subsystem, and the navigation subsystem and wherein the means for plotting a map comprises a means for converting information from the received signals from spherical coordinates to Cartesian coordinates, means for fitting a plurality of surfaces to the data points using a least square fit, means for determining normals to the surfaces, and means for merging adjacent surfaces with similar normals.

6. A multipurpose autonomous vehicle, as claimed in claim 5, wherein the means for plotting a map further comprises, a means for performing a Hough transform, a means for performing blob labeling, and a means for performing landmark recognition.

7. A method of using a control means on an autonomous vehicle for directing the autonomous vehicle to a desired location, comprising the steps of:
   accepting data from a plurality of sensors on the vehicle;
   using the data from the plurality of sensors to construct a map;
   using the map to plot a path from an initial position to a general final location where the desired location is located;
   moving the autonomous vehicle along the plotted path;
   continuously determining present location along the plotted path;
   continuously accepting data from the plurality of sensors;
   continuously using data from the plurality of sensors to update the map;
   continuously determining if a new plotted path is needed;
   using the updated map to plot a new path when needed;
   moving the autonomous vehicle along the new plotted path;
   approaching the general final location;
   searching the general final location for a target located at the desired location;
   plotting a path from the present location to the target; and moving the autonomous vehicle along the plotted path.

8. A method of using a control means on an autonomous vehicle for directing the autonomous vehicle to a desired location, comprising the steps of:
   accepting data from a plurality of sensors on the vehicle;
   using the data from the plurality of sensors to construct a map;
   using the map to plot a path from an initial position to a general final location where the desired location is located;
   moving the autonomous vehicle along the plotted path;
   continuously determining present location along the plotted path;
   continuously accepting data from the plurality of sensors;
   continuously using data from the plurality of sensors to update the map;
   continuously determining if a new plotted path is needed;
   using the updated map to plot a new path when needed;
   moving the autonomous vehicle along the new plotted path;
   using the data from the plurality of sensors to plot paths of moving obstacles; and
   using the plotted paths of moving obstacles to plot a path and a speed from the present location to the desired location which avoids the moving objects.

9. A method, as claimed in claim 8, further comprising the step of powering the control means with power from a plurality of batteries mounted on the autonomous vehicle.

10. A method of using a control means on an autonomous vehicle for directing the autonomous vehicle to a desired location, comprising the steps of:
   accepting data from a plurality of sensors on the vehicle;

using the data from the plurality of sensors to construct a map;
using the map to plot a path from an initial position to a general final location where the desired location is located;
moving the autonomous vehicle along the plotted path;
continuously determining present location along the plotted path;
continuously accepting data from the plurality of sensors;
continuously using data from the plurality of sensors to update the map;
continuously determining if a new plotted path is needed;
using the updated map to plot a new path when needed; and
moving the autonomous vehicle along the new plotted path, wherein the step of using data to construct a map uses a Hough transform and blob labeling.

11. A method of using a control means on an autonomous vehicle for directing the autonomous vehicle to a desired location, comprising the steps of:
accepting data from a plurality of sensors on the vehicle;
using the data from the plurality of sensors to construct a map comprising the steps of:
converting data from spherical coordinates to Cartesian coordinates;
fitting a plurality of surfaces to the data points using a least square fit;
determining normals to the surfaces; and
merging adjacent surfaces with similar normals;
using the map to plot a path from an initial position to a general final location where the desired location is located;
moving the autonomous vehicle along the plotted path;
continuously determining present location along the plotted path;
continuously accepting data from the plurality of sensors;
continuously using data from the plurality of sensors to update the map;
continuously determining if a new plotted path is needed;
using the updated map to plot a new path when needed; and
moving the autonomous vehicle along the new plotted path.

12. A method as claimed in claim 11, wherein the step of using data to construct a map, further comprises the steps of:
using data from a video camera to provide additional information; and
using landmark recognition to define groups of surfaces.

* * * * *